United States Patent
Middleton (10) Patent No.: US 10,143,925 B2
(45) Date of Patent: Dec. 4, 2018

(54) DYNAMIC GAMING ENVIRONMENT

(71) Applicant: Sony Mobile Communications AB, Lund (SE)

(72) Inventor: David Desmond Middleton, Malmo (SE)

(73) Assignee: Sony Mobile Communications Inc., Tokyo (JP)

( * ) Notice: Subject to any disclaimer, the term of this patent is extended or adjusted under 35 U.S.C. 154(b) by 109 days.

(21) Appl. No.: 15/276,672

(22) Filed: Sep. 26, 2016

(65) Prior Publication Data
US 2017/0007928 A1    Jan. 12, 2017

Related U.S. Application Data

(63) Continuation of application No. 11/970,243, filed on Jan. 7, 2008.

(60) Provisional application No. 61/012,240, filed on Dec. 7, 2007.

(51) Int. Cl.
| | |
|---|---|
| A63F 13/217 | (2014.01) |
| A63F 13/65 | (2014.01) |
| A63F 13/216 | (2014.01) |
| A63F 13/332 | (2014.01) |
| A63F 13/92 | (2014.01) |
| A63F 13/30 | (2014.01) |
| A63F 13/35 | (2014.01) |

(52) U.S. Cl.
CPC .............. *A63F 13/65* (2014.09); *A63F 13/12* (2013.01); *A63F 13/216* (2014.09); *A63F 13/217* (2014.09); *A63F 13/332* (2014.09); *A63F 13/35* (2014.09); *A63F 13/92* (2014.09); *A63F 2300/406* (2013.01); *A63F 2300/5573* (2013.01); *A63F 2300/8017* (2013.01)

(58) Field of Classification Search
CPC ...................................................... A63F 13/216
See application file for complete search history.

(56) References Cited

U.S. PATENT DOCUMENTS

| | | | |
|---|---|---|---|
| 2003/0224855 A1 | 12/2003 | Cunningham | |
| 2006/0223635 A1 | 10/2006 | Rosenberg | |
| 2007/0265089 A1 | 11/2007 | Robarts et al. | |
| 2009/0005140 A1* | 1/2009 | Rose | A63F 13/00 463/7 |

FOREIGN PATENT DOCUMENTS

| | | |
|---|---|---|
| CN | 1194877 A | 10/1998 |
| CN | 1385803 A | 12/2002 |
| CN | 1487701 A | 4/2004 |

(Continued)

OTHER PUBLICATIONS

International Search Report and Written Opinion for corresponding International Application No. PCT/IB2008/052164, dated Jan. 15, 2009.

*Primary Examiner* — Jay Liddle
(74) *Attorney, Agent, or Firm* — Tucker Ellis LLP (57) ABSTRACT

A method and device are provided for providing a dynamic gaming environment. Physical circumstance information relating to a gaming device, such as ambient conditions or geographic location information, may be identified. A gaming application executing on the gaming device may provide or modify a gaming environment based on the identified physical circumstances information.

14 Claims, 6 Drawing Sheets

(56) References Cited

FOREIGN PATENT DOCUMENTS

| CN | 1507739 A | 6/2004 | | |
|---|---|---|---|---|
| CN | 1522085 A | 8/2004 | | |
| CN | 1767546 A | 5/2006 | | |
| EP | 1758412 A | 2/2007 | | |
| WO | WO 2006095214 A1 * | 9/2006 | ............. | A63F 13/00 |

* cited by examiner

DYNAMIC GAMING ENVIRONMENT

CROSS-REFERENCE TO RELATED APPLICATION

The present application claims priority from U.S. Provisional Patent Application No. 61/012,240, filed Dec. 7, 2007, the disclosure of which is incorporated by reference herein in its entirety, and a continuation of U.S. Utility patent application Ser. No. 11/970,243 filed on Jan. 7, 2008, the disclosure of which is incorporated by reference herein in its entirety.

BACKGROUND

Modern portable electronics devices, such as cellular telephones can perform various types of functions/applications, such as making telephone calls, sending and receiving messages, browsing the Internet, receiving different types of feeds like RSS (really simple syndication) feeds, etc. Other applications increasingly more common on portable electronics devices include gaming applications. Portable gaming applications may include a wide variety of styles of games, such as simulation games, role playing games, puzzle games, strategy games, online games, first persons shooter (FPS) games, etc.

Typically, gaming environments provided by such gaming applications are based solely on static elements (e.g., maps, scenes, levels, etc.) included with the gaming application and controller interfaces for receiving commands from a user. Unfortunately, aside from user controls, typical gaming applications do not provide for dynamic gaming environments adapted to reflect a user's physical environment.

SUMMARY

According to one aspect a method may include identifying physical circumstances information associated with a gaming device; and providing or modifying a gaming environment on the gaming device based on the identified physical circumstances information.

Additionally, the physical circumstances information may include ambient condition information representative of a physical environment associated with the gaming device.

Additionally, the ambient condition information may include at least one of ambient light information or received sound information.

Additionally, the gaming environment may be dynamically provided based on the ambient condition information.

Additionally, the physical circumstances information may include location identification information associated with a geographic location of the gaming device.

Additionally, identifying the location identification information may include receiving location-related information from a global positioning system; and calculating the location identification information based on the received location-related information.

Additionally, identifying the location identification information may include identifying a geographic location corresponding to a closest cellular transmission tower wirelessly connected to the gaming device; and determining the location identification information based on the identified geographic location corresponding to the closest cellular transmission tower.

Additionally, identifying the location identification information may include identifying a geographic location corresponding to a service provider access point connected to the gaming device; and determining the location identification information based on the identified geographic location corresponding to the service provider access point.

Additionally, the method may include retrieving location-related gameplay information based on the identified location identification information; and providing the gaming environment on the gaming device based on the retrieved location-related gameplay information.

Additionally, the location-related gameplay information may include one of: demographics information, time of day information, day of week information, month information, terrain information, weather condition information, traffic information, laws and regulations information, or language information.

Additionally, the location-related gameplay information may be retrieved from a remote resource via one or more networks.

Additionally, the remote resource may include one of a server, a website, or a database.

Additionally, the method may include receiving changes to the physical circumstances information; and dynamically modifying the gaming environment based on the received changes.

In a second aspect, a gaming device may include logic to identify information associated with an environment of the gaming device; and a processor. The processor may be configured to execute a gaming application; receive the information associated with an environment of the gaming device from the logic; and provide a gaming environment in the gaming application based on the received information.

Additionally, the logic may include at least one of a microphone, a light sensor, etc., wherein the logic is configured to identify ambient conditions associated with the gaming device.

Additionally, the logic may be configured to identify a geographic location of the gaming device.

Additionally, the processor may be further configured to retrieve location-related gameplay elements based on the identified geographic location; and provide the gaming environment in the gaming application based on the retrieved location-related gameplay elements.

In a third aspect, a device may include means for identifying at least one of ambient condition information or geographic location information associated with a gaming device; means for executing a gaming application on the gaming device; means for providing a gaming environment in the gaming application based on the identified at least one of the ambient condition information or geographic location information; means for receiving changes to the identified at least one of the ambient condition information or geographic location information; and means for providing an updated gaming environment based on the received changes.

Additionally, the gaming device may include one of a mobile telephone or a handheld gaming device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF EMBODIMENTS

The following detailed description refers to the accompanying drawings. The same reference numbers in different drawings may identify the same or similar elements. Also, the following detailed description does not limit the invention.

A system and a method are described for providing a dynamic gaming experience to a user of a gaming device. In one embodiment, physical circumstance information and/or environment-related information, such as ambient condition or geographical location information may be sensed, received, or retrieved by a gaming device. The physical circumstances information may then be integrated into a gaming experience provided to a user of the gaming device.

Exemplary Gaming Device

Figure 1:
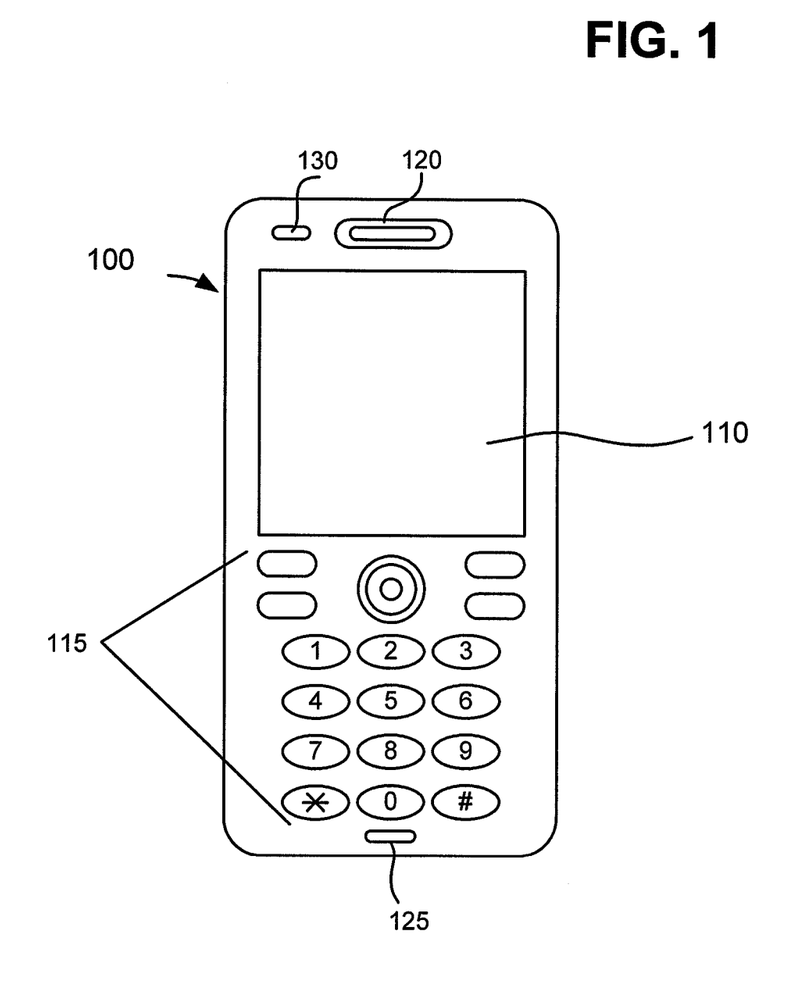
FIG. 1 is a diagram of an exemplary gaming device with which the systems and methods described below may be implemented.

FIG. 1 is a diagram illustrating an exemplary gaming device 100 in which systems and methods described herein may be implemented. As illustrated in FIG. 1, gaming device 100 may include may include a display 110, a keypad 115, a speaker 120, a microphone 125, and a light sensor 130. Gaming device 100 may include additional components and features commensurate with their respective functions.

Display 110 may facilitate presentation of graphical information to a user of gaming device 100 as well as facilitate the reception of information, via graphical user interfaces provided on display 110. Keypad 115 may include a collection of buttons or other input devices (e.g., a touchscreen, touch-sensitive elements, etc.) that may receive information from a user of gaming device 100. Speaker 120 may include any device capable of converting electrical signals into emitted sounds. Microphone 125 may include any device capable of receive audible sounds and converting the audible sounds into one or more electrical signals. Light sensor 130 may include a device for detecting ambient light or light directed toward light sensor 130. In one implementation, light sensor 130 may be sensitive to variations in detected light using any suitable technology, such as photodiodes or other photoelectric components.

Gaming device 100 may include various devices designed to facilitate game play by a user. In one implementation, gaming device 100 may include various devices or elements configured to enable gaming device 100 to communicate with other devices, e.g., other gaming devices 100, server computers, network resources, etc., to enable data transmission therebetween. Examples of suitable devices may include cellular radiotelephones; Personal Communications System (PCS) devices that may combine a cellular radiotelephone with data processing, facsimile and data communications capabilities; Personal Digital Assistants (PDAs) that can include a radiotelephone, pager, Internet/intranet access, Web browser, organizer, calendar and/or a global positioning system (GPS) receiver; portable gaming devices, such as the Nintendo DS® or Gameboy® from Nintendo Corporation and the Playstation Portable® (PSP) from Sony Electronics Inc.; console gaming devices, such as the Xbox® or Xbox 360® from Microsoft Corporation, the Playstation® family of consoles from Sony Electronics Inc., the Gamecube® or Wii® from Nintendo Corporation; a desktop, laptop, and/or palmtop computing devices; and/or other similar types of devices configured to provide a gaming environment to users.

In one implementation described in additional detail below, gaming device 100 may receive ambient condition information via one or more sensors (e.g., light sensor 130) or clocks. The ambient condition information may be integrated into or otherwise used by a gaming application executing on the gaming device to provide a dynamic gaming environment representative of the received ambient condition information.

In another implementation, gaming device 100 may communicate with one or more other devices (not shown) using a wired or wireless connection. For example, gaming device 110 may communicate with other devices or entities using a wireless telecommunications protocol, such as GSM (global system for mobile communications), CDMA (code division multiple access), TDMA (time division multiple access) cellular telephone networks, etc. Additionally, shorter range wireless protocols, such as the Bluetooth® protocol, the 802.11x family of wireless protocols, the WiMax protocol, the UltraWideband protocol, etc. Gaming device 100 may communicate with other devices to identify or retrieve location identification information associated with a geographic location of gaming device 100. For example, gaming device 100 may communicate with a collection of global position system satellites to receive facilitate the calculation or identification of its geographic location.

As described in additional detail below, gaming device 100 may be configured to execute one or more gaming applications that are responsive to the physical condition information received, retrieved, or sensed by gaming device 100.

Exemplary Gaming Device Configuration

Figure 2:
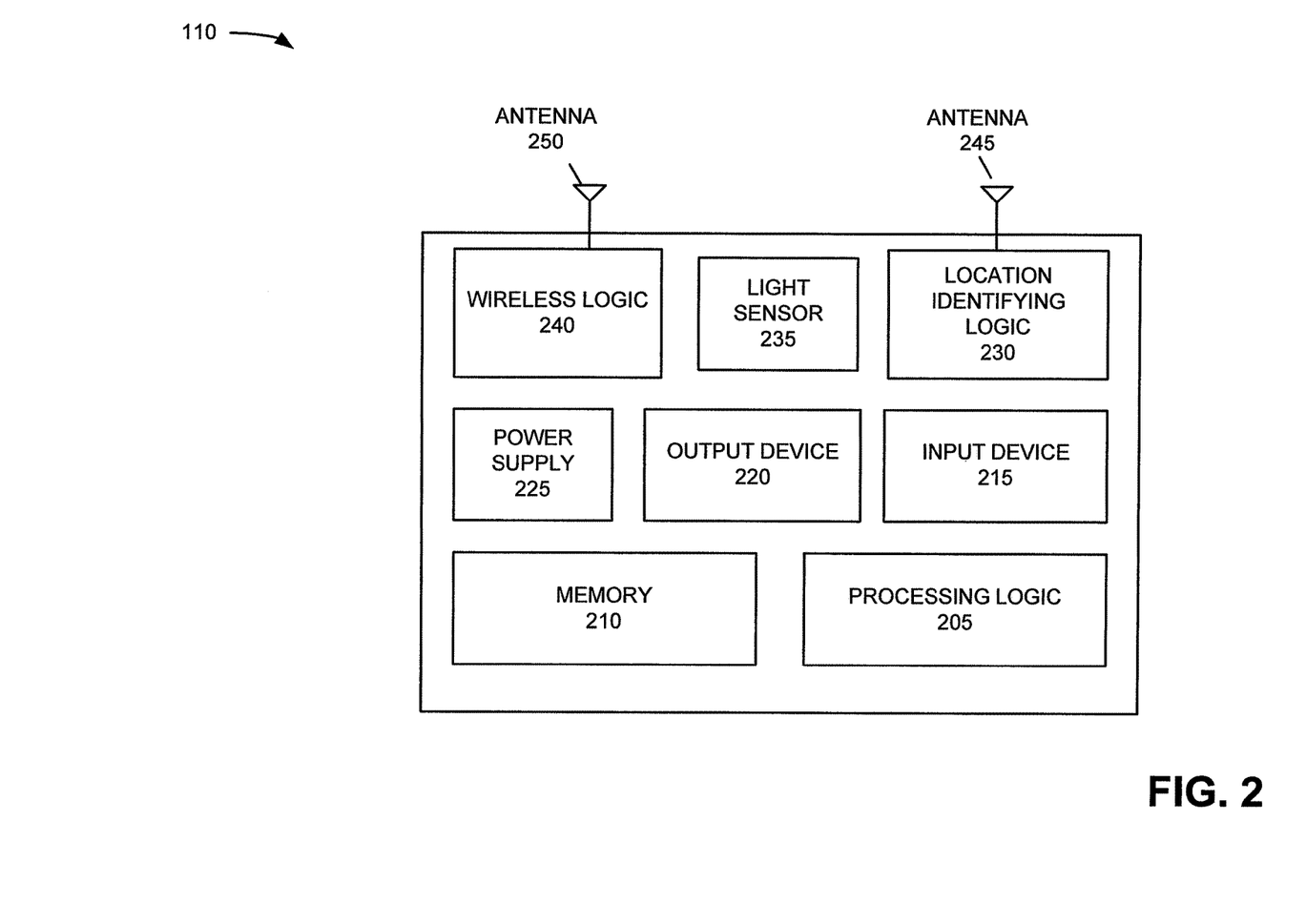
FIG. 2 is a diagram of exemplary components of the gaming device of FIG. 1.

FIG. 2 is a first exemplary diagram of gaming device 100. In other implementations, gaming device 100 may be configured to include more or fewer elements. One embodiment of gaming device 100 will be described in additional detail below. As illustrated in FIG. 2, gaming device 100 may include processing logic 205, a memory 210, an input device 215, an output device 220, a power supply 225, location identifying logic 230, a light sensor 235, wireless logic 240, and antennas 245 and 250. It will be appreciated that gaming device 100 may include other components (not shown) that aid in receiving, transmitting, and/or processing data. Moreover, it will be appreciated that other configurations are possible.

Processing logic 205 may include any type of processor or microprocessor that may interpret and execute instructions. In other implementations, processing logic 205 may be implemented as or include an application specific integrated circuit (ASIC), a field programmable gate array (FPGA), or the like. In one implementation, processing logic 205 may be configured to maintain a clock corresponding to a local time associated with gaming device 100. A gaming application executing on processing logic 205 may use the time maintained by the clock to dynamically adjust elements in a gaming environment. For example, a time of day in the gaming environment may be adjusted based on the clock value provided by processing logic 205. Alternatively, lighting conditions in the gaming environment or other gameplay aspects may be adjusted based on the clock value provided by processing logic 205.

Memory 210 may include a random access memory (RAM) or another type of dynamic storage device that may store information and instructions for execution by processing logic 205, a read only memory (ROM) or another type of static storage device that may store static information and instructions for the processing logic 205, and/or some other type of magnetic or optical recording medium and its corresponding drive for storing information and/or instructions.

Input device 215 may include a device that permits a user to input information to gaming device 100, such as a keypad or collection of buttons, a keyboard, a mouse, a touchscreen, a pen, a microphone, a compass, one or more biometric mechanisms, and the like. In one implementation, a gaming application executing on processing logic 205 may use input received via input device 215 to dynamically adjust elements in a gaming environment. For example, sounds or sound levels received by a microphone (e.g., microphone 125) and provided to processing logic 205 may be used to dynamically adjusted gameplay elements, such as a character's ability to communicate, a character's ability to avoid detection, etc. Alternatively, input device 215 may include a compass or other device for monitoring a geophysical orientation of gaming device 100, such as a direction, etc. Information regarding the geophysical orientation of gaming device 100 may be provided to processing logic 205 and may result in additional dynamically adjusted gameplay elements.

Output device 220 may include a device that outputs information to the user, such as a display, a printer, a speaker, etc. Power supply 225 may include a battery, or the like, for providing power to the components of gaming device 100.

Location identifying logic 230 may include a GPS receiver or other chip set suitable for tracking or otherwise acquiring or calculating a geographic or spatial position of gaming device 100. In other exemplary implementations, location identifying logic 230 may include logic configured to use multiple cellular radiotelephone signals or tower locations to calculate a geographic location. Location identifying logic 230 may interface with processing logic 205, memory 210, and power supply 225 by way of one or more busses (not shown). Additionally, location identifying logic 230 may also interface with one or more antennas 245 and 250 to receive one or more location-related signals. In yet another implementation consistent with embodiments described herein, location identifying logic 230 may include logic configured to receive location information from a service provider associated with gaming device 100. For example, a location of a service provider or server provider network access point connected to gaming device 100 may be associated with a general location of gaming device 100 in the absence of more specific location information.

Upon determination of a location associated with gaming device 100, a signal (or signals) indicative thereof may be transmitted to processing logic 205. Processing logic 205 may then use the identified location to provide information to a gaming application executing on processing logic 205. For example, the gaming application may be configured to provide a gaming environment that corresponds to the physical location identified by location identifying logic 230. Alternatively, gameplay options or features may be provided based at least in part on the location identified by location identifying logic 230. For example, a user of a driving game may be provided with a left-hand drive car or a right-hand drive car based on the identified location. Similarly, a virtual location or a direction of traffic flow in the driving game may be manipulated based on the identified location.

Even more specifically, micro-level features of the identified location may be mapped to the gaming environment. For example, upon receipt of the location information or signals from location identifying logic 230, the gaming application may identify physical features corresponding to the identified location. For example, a terrain, population density, demographic features, weather conditions, etc., may be identified and used to provide corresponding or related aspects of the gaming environment provided to the user. This information may be retrieved from local storage (e.g., memory 210), or alternatively, from a remote device or server accessed via wireless logic 240. In the case of weather conditions, information relating current weather conditions in a location corresponding to the identified location may be retrieved from a remote resource, such as a weather related website or other information source. By providing identified location information to a gaming application executing on gaming device 100, a user's physical location or environment may be integrated into the gaming environment provided to the user.

In one specific implementation, location identifying logic 230 may include a twelve-channel GPS (global positioning system) receiver capable of receiving up to twelve simultaneous GPS satellite signals via antenna 245. As is known in the art, the GPS system is comprised of 27 GPS satellites (24 active and 3 backups) each configured to orbit the earth twice each day. The positions of the satellites are such that at least four GPS satellites are "visible" in the sky at any one time. Each satellite generates a radio signal include time and date, latitude, longitude, satellite identification information and ephemeris data. Ephemeris data may include information such as satellite health, position in the sky, and availability.

In order to accurately track the location of gaming device 100 in two dimensions (e.g., no altitude or z-direction) signals from at least three satellites should be received, thus resulting in a known location on the Earth's surface using a concept known as 3-D trilateration. In generally, trilateration works because the speed of the satellite signals and their respective locations are known. By accurately synchronizing the clocks on the mobile devices and the satellites, a time taken for the GPS receiver to "receive" a signal from each satellite may be used to identify the distance from the satellite to the receiver. Once distances from at least three satellites have been determined, the receiver's location may be determined, since there will be only one point on the Earth's surface that meets each of these distances. For more precise location identification including the receiver's altitude, a fourth satellite signal may be required. It should be understood that signals from more than four satellites may also be received at any one moment, thereby enhancing the performance of location identifying logic 230.

In one implementation, location identifying logic 230 may include a local memory (not shown) for storing satellite ephemeris or other data for a predetermined period of time. Alternatively, location identifying logic 230 may interconnect with memory 210 for storage of this information.

Figure 3:
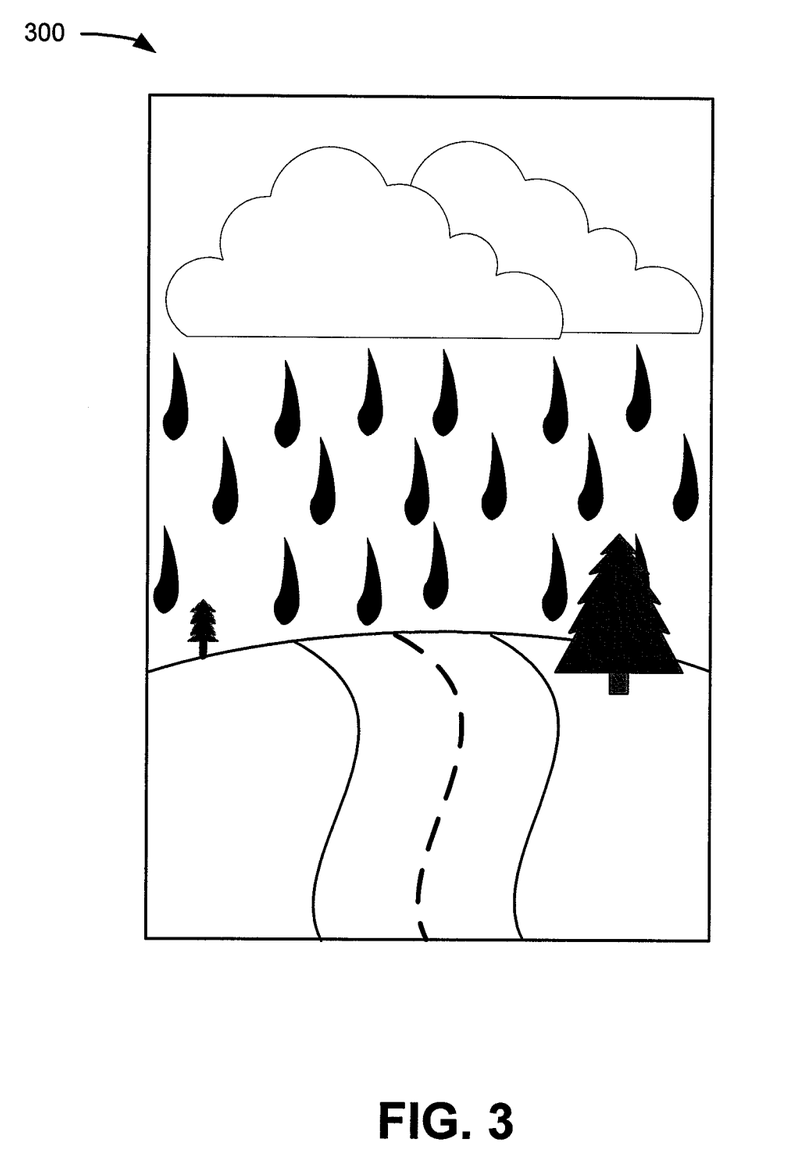
FIG. 3 is a diagram of an exemplary gaming environment provided to a user of the gaming device of FIG. 1.

FIG. 3 illustrates an exemplary gaming environment 300 provided to a user of gaming device 100. As illustrated, gaming environment 300 depicts a driving game environment having weather conditions (e.g., rain) corresponding to weather conditions associated with the geographic location of gaming device 100. In the manner described above, gaming device 100, upon executing of a gaming application, may retrieve local condition information using location identification information determined by gaming device 100. The local condition information may be retrieved from a remote resource, such as a website or database. Alternatively, local condition information may be retrieved locally from, e.g., memory 210. In one implementation, as illustrated in FIG. 3, the local condition information may include weather information. The retrieved weather information may be used by the gaming application to provide gaming environment 300 that mimics the local conditions corresponding to gaming device 100.

Referring back to FIG. 2, light sensor 235 may include a detector or sensor for detecting ambient light or light directed toward light sensor 235. In one implementation, light sensor 235 may be sensitive to variations in detected light using any suitable technology, such as photodiodes or other photoelectric components. In response to light detection, a signal indicative thereof may be transmitted to processing logic 205. In one implementation, light sensor 235 may be used to monitor a level of ambient light in an environment. Processing logic 205 may then use the monitored ambient light level to provide information to a gaming application executing thereon. For example, the gaming application may be configured to provide lighting in a gaming environment that is similar to the sensed ambient light. Alternatively, manipulation of the sensed ambient light may result in a modified gaming experience. For example, lower levels of sensed ambient light may provide an increased chance of a user's character avoiding detection in the gaming environment. Alternatively, high levels of sensed ambient light may result in an increased ability to see and/or discover items presented or hidden in the gaming environment. In this manner, a user's physical environment may be used to enhance a gaming environment provided to the user.

Wireless logic 240 may include a transceiver device capable of transmitting and receiving data and control signals using a wireless communications protocol such as a cellular radiotelephone protocol (e.g., GSM (global system for mobile communications), PCS (personal communication services), FDMA (frequency division multiple access), CDMA, TDMA, etc.). In additional implementations, wireless logic 240 may use short distance wireless communication protocols such as the Bluetooth protocol, one or more of the IEEE 802.11 protocols, the WiMax protocol, the UltraWideband protocol, or any other suitable wireless communication protocol.

Antennas 245 and 250 may include, for example, one or more directional antennas and/or omni-directional antennas.

Exemplary Systems

Figure 4:
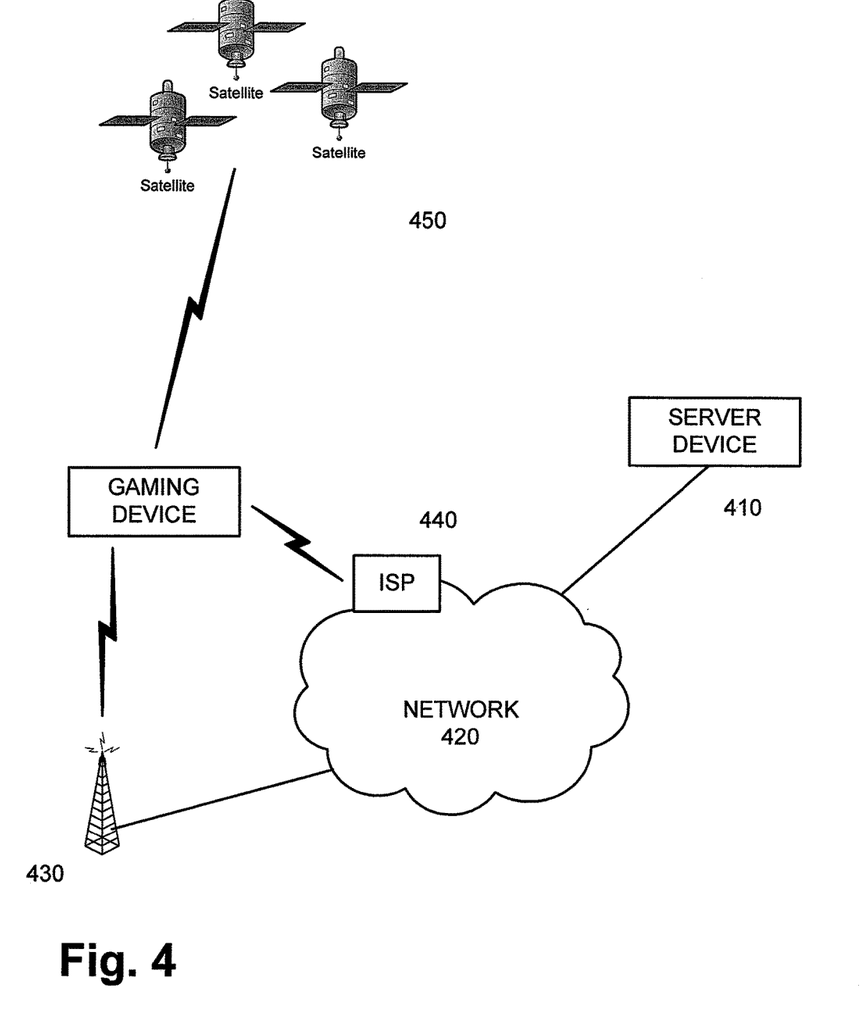
FIG. 4 is a diagram of an exemplary system including the gaming device of FIG. 1.

FIG. 4 is a block diagram of a first exemplary system 400 in which systems and methods described herein may be implemented. As illustrated, system 400 may include a gaming device 100, a server device 410 interconnected by a network 420. System 400 may further include a cellular transmission tower/mobile telephone switching office (MTSO) 430, an Internet Service Provider (ISP) 440, and a GPS satellite constellation 450. Gaming device 100, server device 410, and/or ISP 440 may connect to network 420 via wired and/or wireless connections. A single gaming device, server device, cellular tower/MTSO, and ISP have been illustrated in FIG. 4 for simplicity. In practice, there may be any number of gaming devices, server devices, cellular towers/MTSOs, ISPs, and/or networks. Also, in some instances, one or more of gaming device 100 and/or server device 410 may perform one or more functions described as being performed by another one or more of gaming device 100 and/or server device 410.

As described above in relation to FIG. 1, gaming device 100 may include various devices designed to facilitate game play by a user. For example, gaming device 100 may include a mobile radiotelephone configured to support gaming applications and provide one or more gaming environments; a handheld gaming device, such as a Nintendo DS® or Playstation Portable®; a console gaming device, such as an Xbox 360®, a Playstation 3®, or a Nintendo Wii®; or a personal computing device, such as a desktop computer, or a laptop/notebook/palmtop computer.

Server device 410 may include one or more server entities, or other types of computation or communication devices, that gather, process, search, and/or provide information in a manner described herein. In one implementation, server device 410 may include a server (e.g., a computer system or an application) capable of servicing requests for location-related information from gaming device 100. For example, server device 410 may receive a request from gaming device 100 via network 420 relating to current weather conditions corresponding to a geographic location. In another implementation, server device 410 may receive a request for other location-related information, such as population information, demographic information, time of day information, day of week information, month of year information, etc.

Network 420 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless CDMA, etc.), or a combination of networks. In one implementation, network 420 may include a combination of a cellular telephone network and a data network, such as the Internet, wherein the location-related information requests from gaming device 100 are initially received and forwarded by a cellular transmission tower/MTSO 430. In an alternative implementation, network 420 may include a local wired or wireless data network (e.g., a 802.11x (Wi-Fi) wireless network) and a data network, such as the Internet, wherein location-related information requests are initially received and forwarded by an Internet Service Provider (ISP) 440 associated with the local data network.

In another implementation consistent with aspects described herein, gaming device 100 may determine the location identification information using GPS satellite constellation 450 in the manner described in detail above. Alternatively, gaming device 100 may determine the location identification information using known geographic location information associated with one or more cellular towers/MTSO's to which it is communicating.

As discussed above in relation to FIGS. 2 and 3, physical circumstances information, such as ambient condition or location information, received or identified by gaming device 100 may be used to form the basis of additional location-related information requests directed to server device 410 via network 420.

Exemplary Processing

Figure 5:
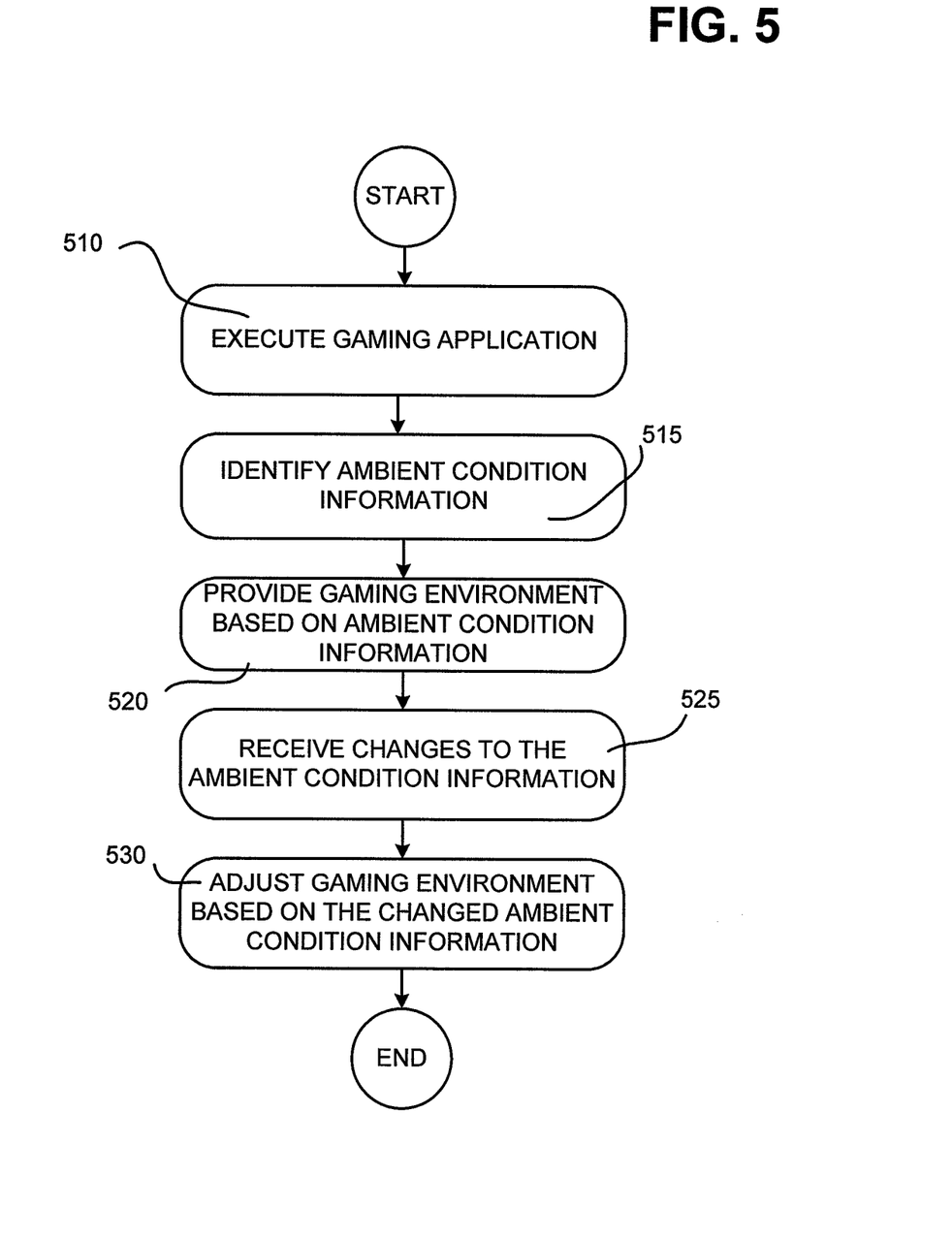
FIGS. 5 and 6 are flowcharts of exemplary processes for providing a dynamic gaming environment.

FIG. 5 is a flowchart of a first exemplary process for providing a dynamic gaming environment. Processing may begin with gaming device 100 executing a gaming application provided, for example, in memory 210 (block 510). The execution of the gaming application may be based on a request received from a user or based on other elements, such as a time of day, previous power-state of gaming device 100, etc. Ambient condition information relating to a physical or temporal conditions associated with gaming device 100 may be identified (block 515). For example, ambient light levels may be determined by, for example, light sensor 235. A time of day may be determined based on a clock associated with processing unit 205. Ambient sound levels may be determined by processing logic 205 based on signals generated by input device 215 (e.g., via microphone 125). A geophysical orientation of gaming device 100 may be identified by a compass or other device (not shown). For example, a geophysical orientation such as a direction a user (or gaming device 100) is facing may be used to provide the gaming environment.

The gaming application may provide a gaming environment to the user based on the received ambient condition information (block 520). Changes to the ambient condition information may be received (e.g., changes in sensed light levels, changes in sound levels, time changes, etc.) (block 525). The received ambient condition information changes may reflect physical changes sensed or determined by gaming device 100. The gaming environment may be adjusted based on the received changes (block 530). For example, a change in sensed light input may result in a modified lighting in the gaming environment. In one implementation, a gaming application may provide a virtual 3D world environment. The gaming environment may be provided differently based on a level of ambient light in the user's real world environment. For example, a high levels of ambient light may be required to enable a user to discover a needed object in the environment. Alternatively, a low level of ambient light may enable the user to hide from an enemy in the gaming environment.

A change in local time may result in modified lighting, traffic patterns or congestion in a driving gaming environment, etc. In one example, time of day information may be used to provide the gaming environment to reflect time-based driving conditions. For example, a morning time may result in sunrise conditions in the east, an evening time may result in twilight conditions requiring headlights to see.

A change in sensed sound input may result in an increased or decreased ability to communicate with aspects of gaming environment. For example, low levels of sound input may enable a user to remain hidden in the gaming environment, while high levels of sound input may facilitate communication within the gaming environment.

Figure 6:
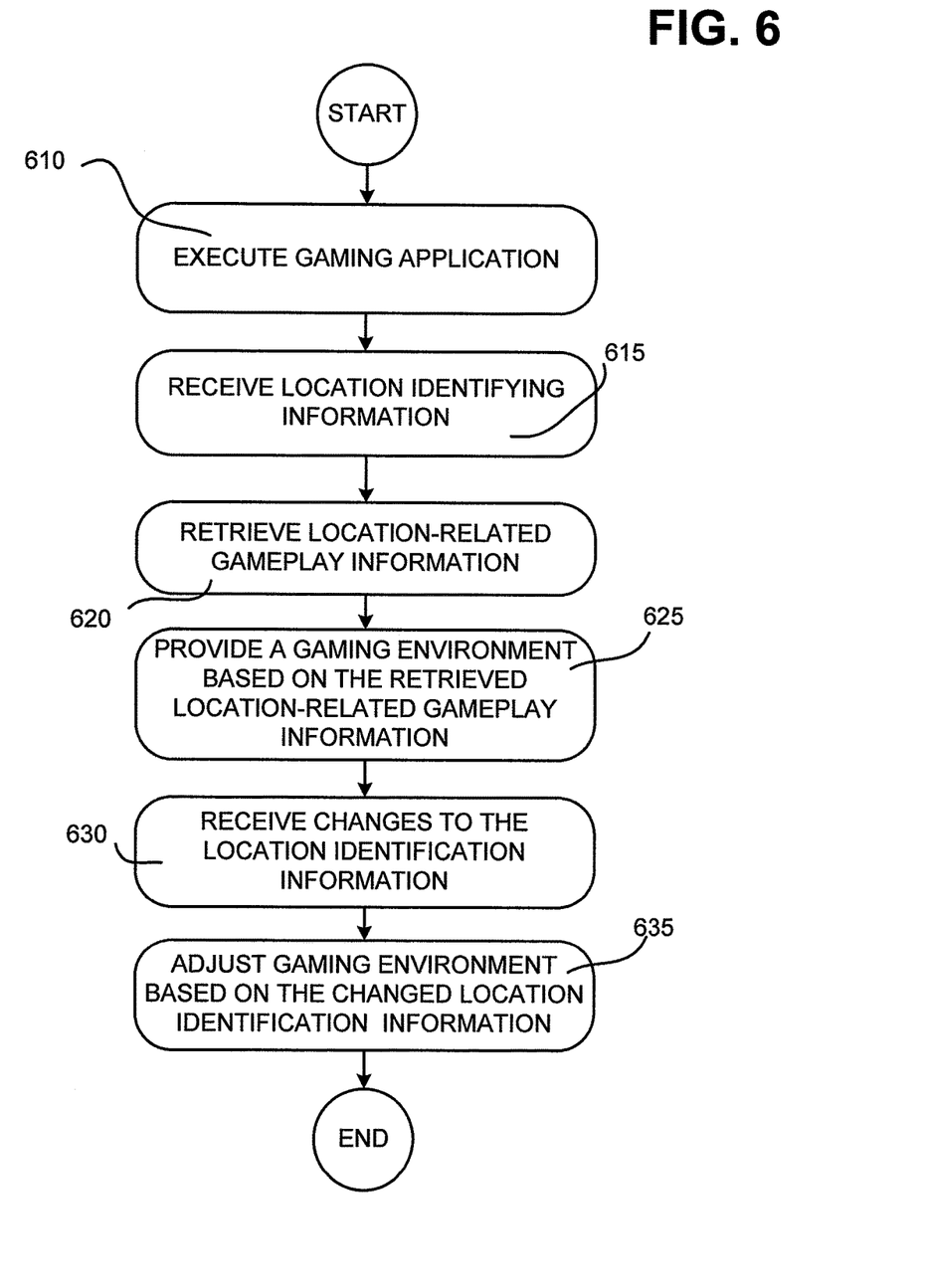

FIG. 6 is a flowchart of a second exemplary process for providing a dynamic gaming environment. Processing may begin with gaming device 100 executing a gaming application provided, for example, in memory 210 (block 610). The execution of the gaming application may be based on a request received from a user or based on other elements, such as a time of day, previous power-state of gaming device 100, etc. Location identification information relating to a geographical location of gaming device 100 may be received by the gaming application (block 615). As described above, location identifying logic 230 may provide the location identifying information to processing logic 200 executing the gaming application. The location identifying information may be based on GPS data, cellular tower data, Internet service provider location, or any combination thereof. For example, the location identifying information may be determined in response to data received from a GPS satellite constellation 450 of FIG. 4.

The gaming application may retrieve location-related gameplay information corresponding to the received location identification information (block 620). In one implementation, the location-related gameplay information may be maintained locally to gaming device 100, e.g., in memory 210. In such an implementation, the location-related gameplay information may be maintained in a database and retrieved based on a database query including the location identification information.

In another implementation described herein, the location-related information may be retrieved from a remote resource (e.g., server device 410) via a network (e.g., network 420). In this implementation, the location-related information may be retrieved from a variety of sources, such as websites, databases, etc. and may include current or dynamic information, such as weather conditions, traffic density or patterns, time of day information, etc. as well as more static information, such as laws and regulations, languages, etc. associated with the location identification information.

The gaming application may provide a gaming environment to the user having aspects based (at least in part) on the retrieved location-related gameplay information (block 625). For example, a time of day experienced in the gaming environment may be identified based on a time of day identified in the retrieved location-related gameplay information. In addition, location-related gameplay features may be provided based on the retrieved location-related gameplay information. For example, driving laws and conventions in a driving game may be based on the received location identification information. The gaming environment may be based on geographic features (e.g., terrain) associated with the location identified in the received location identification information. For example, a location's population, demographics, terrain, etc. may be used to provide the gaming environment.

In one exemplary embodiment, a driving game application may provide a gaming environment based on the retrieved location-related gameplay information. For example, the location-related gameplay information may include weather information retrieved from a weather application provided on gaming application or from a remote resource (e.g., server device 410). The retrieved weather information may result in a corresponding gaming environment, such as wet road conditions during rain, icy road conditions during snow or ice storms, etc. Each factor may have a corresponding impact on game difficulty or performance.

In another exemplary implementation, the driving game application may retrieve location-relating gameplay information that includes details relating to the geographic location of gaming device 100. For example, a mountainous geographic location may correspond to a mountainous gaming environment in the driving game, etc. Alternatively, locality information, such as a city or country in which gaming device is located may be used to provide a corresponding gaming environment. In another implementation, a location of gaming device 100 may be integrated into a mapping element of the gaming environment, enable a user to mimic a real world route in the gaming world.

Changes to the location identification information may be received (e.g., changes in terrain, geographic location, etc.) (block 630). The received location identification information changes may reflect a change in a geographic location of gaming device 100. The gaming environment may be adjusted based on the received location identification information changes (block 635). For example, a change in location may result in gaming application receiving modified terrain information corresponding to the modified location.

An enhanced gaming environment may be provided by incorporating ambient condition and/or location information.

CONCLUSION

Implementations described herein may provide a system and method for significantly enhancing gameplay on a gaming device. In one implementation, ambient condition information may be received and used to generate a gaming environment. In another implementation, location-related information may be received that relates to a geographic location of a gaming device. The received location-related information may be used to generate the gaming environment.

The foregoing description of preferred embodiments provides illustration and description, but is not intended to be exhaustive or to limit the invention to the precise form disclosed. Modifications and variations are possible in light of the above teachings or may be acquired from practice of the invention.

For example, although much of the above-descriptions relates to mobile or wireless gaming devices and networked gaming devices, systems and methods consistent with embodiments described herein also include wired and/or stand-alone (e.g., not networked) gaming devices. While series of acts have been described with regard to FIGS. 5 and 6, the order of the acts may be modified in other implementations. Further, non-dependent acts may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method of presenting a game having a visual virtual environment to a user of a mobile gaming device that executes the game, comprising:
   providing, at the mobile gaming device, a first set of characteristics that define the visual virtual environment, wherein each characteristic of the first set of characteristics is related to a geographic location of the mobile gaming device;
   determining, by the mobile gaming device, a current geographic location of the mobile gaming device;
   sensing an ambient light level with a light sensor of the mobile gaming device;
   determining, by the mobile gaming device, a value for each of the first set of characteristics that define the visual virtual environment based on the current geographic location of the mobile gaming device;
   generating, by the mobile gaming device, a value of a non-visual gameplay characteristic at the mobile gaming device:
      wherein the non-visual gameplay characteristic is an avoidance-detection characteristic,
      wherein the value of the non-visual gameplay characteristic is modified based on the sensed ambient light level, and
      wherein when the value of the lighting characteristic indicates a high level of ambient light, the value of the avoidance-detection characteristic is modified to a value that indicates an increased ability of a first character of the game to detect a second character of the game; and
   generating, by the mobile gaming device, the visual virtual environment by visually incorporating and simulating the determined values for each of the first set of characteristics in the visual virtual environment.

2. The method of claim 1, wherein the determining a current geographic location of the mobile gaming device includes communicating with a global positioning system (GPS) satellite network.

3. The method of claim 1, wherein determining a value for each of the first set of characteristics comprises:
   sending the determined current geographic location of the mobile gaming device to a server; and
   receiving the at least one value from the server.

4. The method of claim 1, further comprising:
   determining a time of day at the determined current geographic location.

5. The method of claim 4, wherein the value of the lighting characteristic is further based on the determined time of day.

6. The method of claim 1, wherein the first set of characteristics that define the virtual environment includes a terrain characteristic for the virtual environment.

7. The method of claim 1, wherein the first set of characteristics that define the virtual environment includes a weather characteristic for the virtual environment.

8. A method of presenting a game having a visual virtual environment to a user of a mobile gaming device that executes the game, comprising:
   providing, at the mobile gaming device, a first set of characteristics that define the visual virtual environment, wherein each characteristic of the first set of characteristics is related to a geographic location of the mobile gaming device;
   determining, by the mobile gaming device, a current geographic location of the mobile gaming device;

sensing an ambient sound level with a sound sensor of the mobile gaming device;

determining, by the mobile gaming device, a value for each of the first set of characteristics that define the visual virtual environment based on the current geographic location of the mobile gaming device;

generating, by the mobile gaming device, a value of a non-visual gameplay characteristic at the mobile gaming device:

wherein the non-visual gameplay characteristic is an avoidance-detection characteristic,     wherein the value of the non-visual gameplay characteristic is modified based on the sensed ambient sound level, and     wherein when the value of the sound characteristic indicates a high level of ambient sound, the value of the avoidance-detection characteristic is modified to a value that indicates a decreased ability of a first character of the game to detect a second character of the game; and generating, by the mobile gaming device, the visual virtual environment by visually incorporating and simulating the determined values for each of the first set of characteristics in the visual virtual environment.

9. A method of presenting a game having a visual virtual environment to a user of a mobile gaming device that executes the game, comprising:

providing, at the mobile gaming device, a first set of characteristics that define the visual virtual environment, wherein each characteristic of the first set of characteristics is related to a geographic location of the mobile gaming device;

determining, by the mobile gaming device, a current geographic location of the mobile gaming device;

sensing an ambient sound level with a sound sensor of the mobile gaming device;

determining, by the mobile gaming device, a value for each of the first set of characteristics that define the visual virtual environment based on the current geographic location of the mobile gaming device;

generating, by the mobile gaming device, a value of a non-visual gameplay characteristic at the mobile gaming device:

wherein the non-visual gameplay characteristic is a communication-ability characteristic,     wherein the value of the non-visual gameplay characteristic is modified based on the sensed ambient sound level, and     wherein when the value of the sound characteristic indicates a high level of ambient sound, the value of the communication-ability characteristic is modified to a value that indicates a decreased ability of a first character of the game to detect a second character of the game; and generating, by the mobile gaming device, the visual virtual environment by visually incorporating and simulating the determined values for each of the first set of characteristics in the visual virtual environment.

10. The method of claim 8 or 9, further comprising:

determining a time of day at the determined current geographic location.

11. The method of claim 8 or 9, wherein the determining a current geographic location of the mobile gaming device includes communicating with a global positioning system (GPS) satellite network.

12. The method of claim 8 or 9, wherein the first set of characteristics includes a terrain characteristic for the virtual environment.

13. The method of claim 8 or 9, wherein determining a value for each of the first set of characteristics comprises:

sending the determined current geographic location of the mobile gaming device to a server; and receiving the at least one value from the server.

14. The method of claim 8 or 9, wherein the first set of characteristics that define the virtual environment includes a weather characteristic for the virtual environment.

\* \* \* \* \*